O. E. DIETRICH.
BOLT AND NUT LOCK.
APPLICATION FILED SEPT. 15, 1910.

987,705.

Patented Mar. 28, 1911.

WITNESSES
C. K. Davies.
B. F. Fishburne

INVENTOR
Oliver E. Dietrich
by C. L. Parker, Attorney

UNITED STATES PATENT OFFICE.

OLIVER E. DIETRICH, OF BREMEN, INDIANA.

BOLT AND NUT LOCK.

987,705.  Specification of Letters Patent.  Patented Mar. 28, 1911.

Application filed September 15, 1910.  Serial No. 582,164.

*To all whom it may concern:*

Be it known that I, OLIVER E. DIETRICH, a citizen of the United States, residing at Bremen, in the county of Marshall and State of Indiana, have invented certain new and useful Improvements in Bolt and Nut Locks, of which the following is a specification.

My invention relates to bolt and nut locks.

An important object of this invention is to provide means for locking a nut to a bolt, which will be reliable in operation, simple in construction, and cheap to manufacture.

A further object of this invention is to provide means for locking a nut to a bolt, of such construction that said nut and bolt are not altered or changed for receiving said means.

A still further object of this invention is to provide locking means for a nut and bolt, which may be employed in almost any circumstance where it is desired to use a bolt.

Other objects and advantages of this invention will be apparent during the course of the following description.

Figure 1:
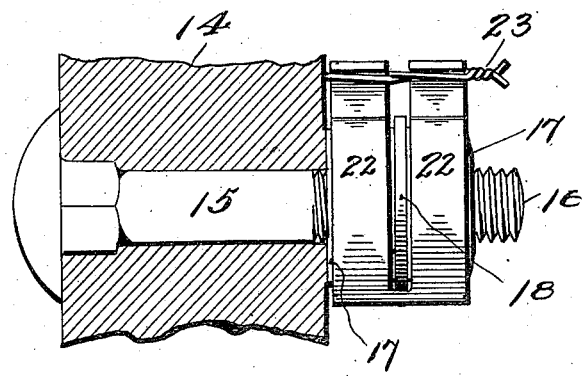
Figure 2:
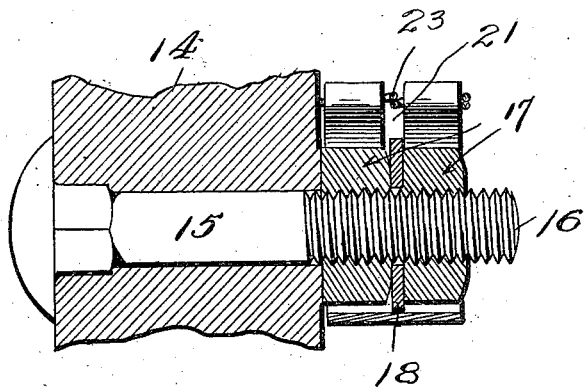
Figure 3:
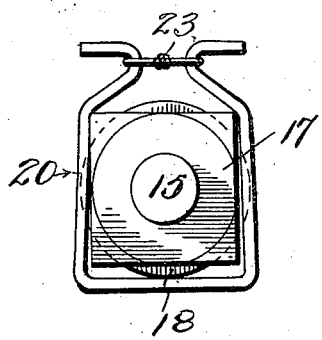
Figure 4:
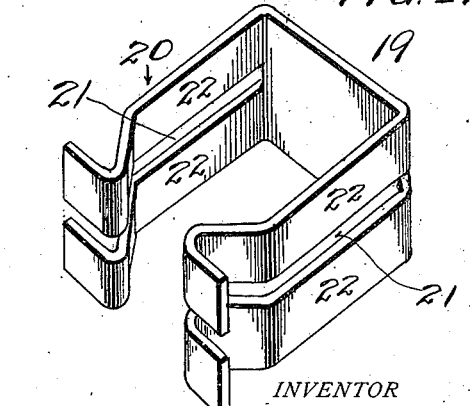

In the accompanying drawings forming a part of this specification, and in which like numerals are used to designate like parts throughout the same, Figure 1 is a side view of a bolt, showing my improved locking means used in connection therewith, Fig. 2 is a similar view, the nuts and locking means being shown in section, Fig. 3 is an end view of the bolt showing the locking means associated therewith, and Fig. 4 is a perspective view of a band-member comprised in the locking means.

In the drawings wherein is illustrated a preferred embodiment of my invention, the numeral 14 designates a plank having a transverse opening formed therethrough, for receiving a bolt 15. This bolt has a screw threaded portion 16, which extends beyond the plank 14, as shown. This screw threaded portion is formed by an ordinary continuous thread having the same diameter throughout, as shown. A pair of nuts 17 are disposed upon the screw threaded portion 16, and a washer 18 is disposed between these nuts, as shown. The washer 18 may preferably be circular and of proper diameter to extend beyond the nuts. A band member 19 is disposed upon the nuts 17 to lock the same together. This band member is substantially U-shaped, as shown, and comprises upstanding sides 20 provided with longitudinal slots 21 for receiving the edge of the washer 18. By this construction the band member 19 is prevented from accidental displacement from the nuts 17, in a direction longitudinally of the bolt. Each of the sides 20 comprises a pair of spaced sections 22, having their free ends bent inwardly and outwardly, as shown. These bent ends are disposed above the nuts 17, and are connected or tied by a preferably crossed section of wire 23, or by any other suitable flexible member.

In the use of the locking means, the inner nut 17 is first placed upon the bolt and screwed thereon to firmly engage the plank 14. The washer 18 is then placed upon the bolt in engagement with said inner nut. The outer nut 17 is then placed upon the bolt and screwed up to firmly engage the washer 18. Owing to the firm engagement of the nuts 17 with the threads 16, said nuts can not be rotated together, but the other nut must first be moved away from the inner nut before the latter can in turn be unscrewed. The band-member 19 prevents the rotation of the outer nut with relation to the inner, whereby both nuts are locked upon the bolt.

I wish it understood that the form of my invention herewith shown and described is to be taken as a preferred example of the same, and that certain changes in the shape, size and arrangement of parts may be resorted to without departing from the spirit of my invention or the scope of the subjoined claims.

Having fully described my invention, I claim:—

1. The combination with a bolt and a plurality of nuts having engagement therewith, of a washer arranged upon said bolt between said nuts, and a band-member connecting said nuts to prevent the rotation of one without the other, having openings formed therethrough to receive said washer.

2. The combination with a bolt and a plurality of nuts having engagement therewith, of a washer arranged upon said bolt between said nuts, and of sufficient size to extend beyond said nuts, and an approximately U-shaped band-member for engaging with said nuts to prevent the rotation of one without the other, said band member having sides thereof provided with slots to receive said washer.

3. The combination with a bolt and a plurality of nuts having engagement therewith, of a washer arranged upon said bolt between said nuts, and of sufficient size to extend beyond said nuts, an approximately U-shaped band-member for engaging with said nuts to prevent the rotation of one without the other, said band member having sides thereof provided with slots for receiving said washer, and means to connect corresponding ends of said band-member.

4. The combination with a bolt and a plurality of nuts having engagement therewith, of a washer arranged upon said bolt between said nuts, and of sufficient size to extend beyond said nuts, an approximately U-shaped band member for engaging with said nuts to prevent the rotation of one without the other, said band member having upstanding sides thereof provided with slots to receive said washer, said upstanding sides having their free ends bent inwardly and outwardly for arrangement above said nuts, and a flexible member to connect said free ends.

In testimony whereof I affix my signature in presence of two witnesses.

OLIVER E. DIETRICH.

Witnesses:
 WM. HELMLINGER,
 THEO. J. N. DIETRICH.

Copies of this patent may be obtained for five cents each, by addressing the "Commissioner of Patents. Washington, D. C."